United States Patent [19]

Levy et al.

[11] Patent Number: 4,859,324
[45] Date of Patent: Aug. 22, 1989

[54] APPARATUS FOR FILTERING MACHINE LIQUID OF AN ELECTROEROSION MACHINE

[75] Inventors: Gideon Levy, Losone; Josef Budin, Minusio; Benjamin Moergeli, Rickenbach, all of Switzerland

[73] Assignee: AG Fur Industrielle Elektronik Agie, Losone Bei Locarno, Switzerland

[21] Appl. No.: 287,402

[22] Filed: Dec. 20, 1988

[30] Foreign Application Priority Data

Dec. 22, 1987 [DE] Fed. Rep. of Germany ....... 3743622

[51] Int. Cl.$^4$ .................. B01D 13/00; B01D 17/038
[52] U.S. Cl. ........................... 210/195.2; 210/257.2; 210/321.69; 210/321.78; 210/321.87; 210/512.1
[58] Field of Search ............... 210/634, 641, 644, 648, 210/649, 650, 651, 652, 787, 788, 804, 805, 806, 195.2, 257.2, 321.69, 321.78, 321.87, 512.1, 685

[56] References Cited

U.S. PATENT DOCUMENTS 4,584,450 4/1986 Inoue .................................. 210/685

Primary Examiner—Frank Sever
Attorney, Agent, or Firm—Helfgott & Karas

[57] ABSTRACT

An apparatus for filtering a machining liquid of an electroerosion machine includes a pump for supplying the machining liquid to a filter having a membrane. The filter is constructed in such a way that the concentrate is carried substantially tangentially to the membrane wall in a circuit, and the concentrate quantity per time unit carried substantially tangentially to the filter membrane wall in the circuit is greater than the permeate quantity per time unit removed from the filter.

16 Claims, 2 Drawing Sheets

APPARATUS FOR FILTERING MACHINE LIQUID OF AN ELECTROEROSION MACHINE

BACKGROUND OF THE INVENTION

The present invention relates to an apparatus for filtering a machining liquid of an electroerosion or spark erosion machine.

Electroerosion machines have a working container filled with a machining liquid in which is immersed a workpiece to be machined by electroerosion. The machine liquid in the case of so-called wire cutting machines comprises pure water or a liquid, the main constituent of which is water, whereas it comprises hydrocarbons in the case of countersinking machines. During the erosion of the workpiece there is a reduction in the machining liquid purity and as a result its electrical conductivity also changes. In order to maintain a given quality of the erosion machining, it is necessary to purify the machining liquid, in order to keep its electrical characteristics and purity within predetermined limits.

Attempts have already been made to use membrane filters in the filtering apparatus for filtering the machining liquid. Thus, e.g. JP-OS 62-24 917 discloses a filtering apparatus with a membrane filter for an electroerosion machine. The filtering apparatus comprises a container for the machining liquid, which is subdivided into two areas by a cellophane membrane. The first area is connected by means of a pump, which is followed by a conventional filter, with the working container of the electroerosion machine and which, by means of a further pump, can be emptied again into the first area of the container. The second area of the container is connected by means of a further pump to an ion exchanger. The ionic concentration in the second container area is in the magnitude range below the ionic concentration in the first container area, so that the ion exchanger can be operated with a low ion density which is advantageous for its operating behavior. In this known filtering apparatus the membrane filter wall merely serves to bring about the adjustable reduction of the ion density for a cycle of an ion exchanger.

For filtering the machining liquid of electroerosion machines, it is also known to use conventional filters with a large mesh size compared with membrane filters.

SUMMARY OF THE INVENTION

It is an object of the present invention to provide an apparatus for filtering a machining liquid of an electroerosion machine which would enable obtaining a high purity of the filtered machining liquid, without clogging of the filter.

This and other objects of the invention are attained by a filtering apparatus in which a filter is constructed in such a way that the concentrate passes substantially tangentially to the membrane filter wall in a circuit.

Surprisingly the apparatus according to the invention makes it possible to use membrane filters for cleaning the machining liquid, without clogging of the membrane filter wall as a result of impurities in the machining liquid. Thus, contrary to the expectations of experts, the apparatus of this invention makes it possible to use a membrane filter for the direct cleaning of the machining liquid, without expected problems occurring as a result of the contamination of the filter. The permeate cleaned by the membrane filter has an excellent purity and therefore also the necessary electrical characteristics for top quality erosion machining.

The filter construction not only makes it easy to manufacture the filter with tangential guidance of the machining liquid, but it is also very suitable to prevent a deposition of dirt in the filter.

The concentrate quantity per time unit carried in the circuit may be approximately 1.5 times to 10 times greater than the permeate quantity per time unit drained off by the filter. This results in particularly favorable flow quantities. It is pointed out that the optimum values run in the direction of a high ratio number (maximum 1) of a permeate to a concentrate.

Very good filtering results with limited clogging tendencies of the filter can be obtained with the membrane filter wall pore size of 0.01 to 2 $\mu$m.

The arrangement of the different containers in the inventive apparatus is particularly advantageous. A particularly efficient membrane filter is obtained with the hollow fibres having a pore size of 0.2 $\mu$m.

In the apparatus according to the invention, any particles which are still deposited and which could lead to a tendency to clog are removed.

It is finally pointed out that, as is conventional practice in filter technology, the contaminated liquid to be cleaned is referred to as "concentrate", whilst the cleaned liquid is referred to as "permeate".

The invention is described in greater detail hereinafter relative to a non-limitative preferred embodiment and with reference to the attached drawings.

DETAILED DESCRIPTION OF THE PREFERRED EMBODIMENT

Figure 1:
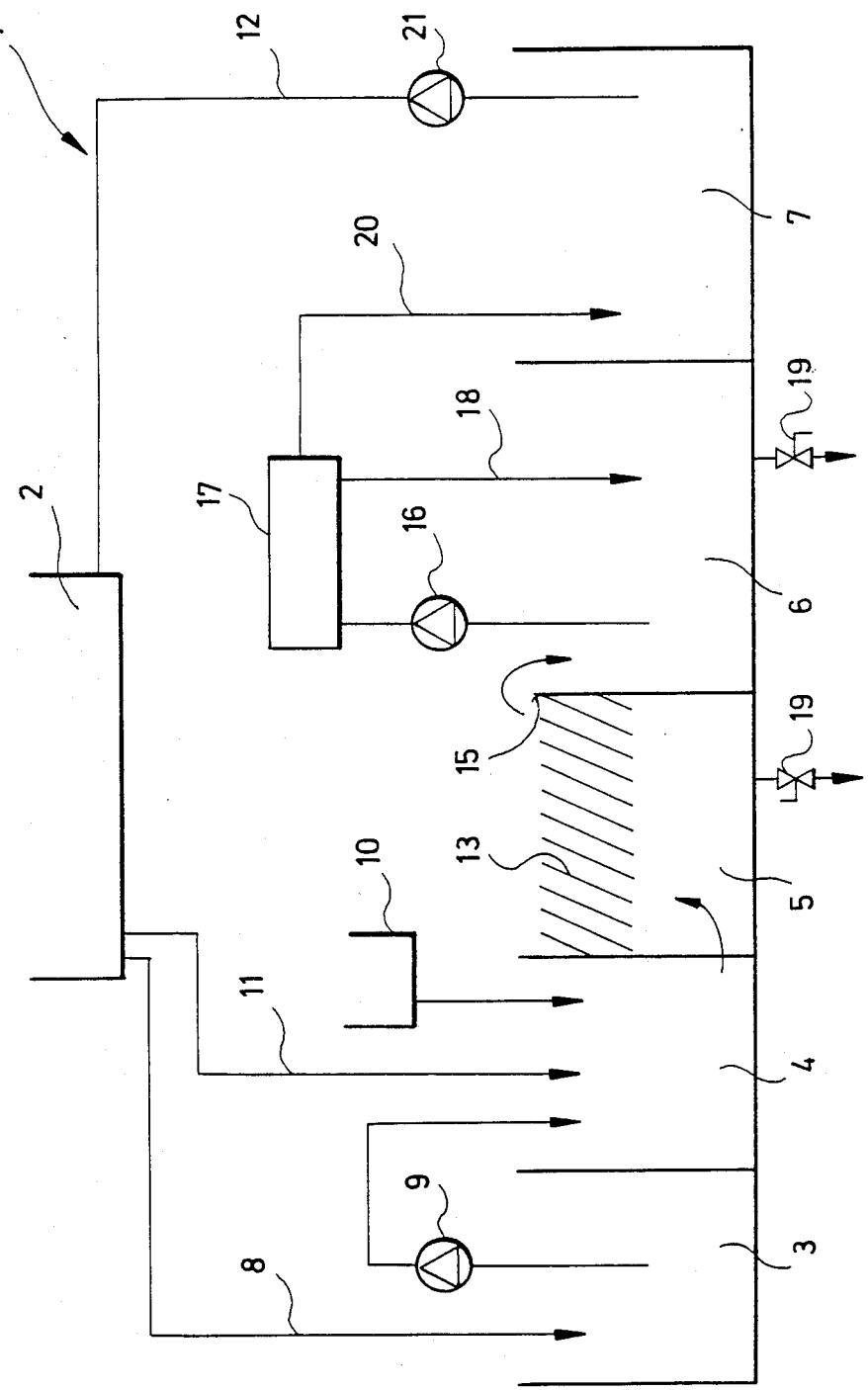
FIG. 1 is a block diagram of the overall arrangement of the apparatus according to the invention.

FIG. 1 shows an apparatus 1 according to the present invention. The apparatus 1 is connected to a working container 2 of a not shown conventional erosion machine. The apparatus 1 comprises a collecting container 3, a flocculation container 4, a sedimentation container 5, an intermediate container 6 and a tank 7. The content of the working container 2 can be supplied by means of a discharge line 8 to the collecting container 3. The content of collecting container 3 can be transferred by means of a first pump 9 and line 9a into the flocculation container 4, to which can be supplied by means of a not shown metering pump a flocculant additive from a flocculant additive container 10 via line 10a.

The content of the working container 2 can also be directly introduced into the flocculation container 4 by means of a suction line 11. Flocculation container 4 is connected to the sedimentation container 5 by a passage 12a arranged close to the bottom of containers 4 and 5.

Sedimentation container 5 contains a plurality of sedimentation guide surfaces 13 which are slightly inclined with respect to the vertical. The sediments of the sedimentation container 5 can be removed by means of a first disposal valve 19a. An overflow 15 of sedimentation container 5 is used for transferring the precleaned machining liquid to the intermediate container 6.

The precleaned concentrate is removed from the intermediate container 6 by means of a second pump 16 and is supplied to a membrane filter 17, which will be explained in greater detail hereinafter relative to FIG. 2, in circuit or cycle manner via a return flow line 18 to the intermediate container 6 again.

In the case of an excessive accumulation of dirt in the intermediate container 6, the latter can be emptied by means of a second disposal valve 19b and namely into a not shown settler, which can be emptied as required.

Although not shown in FIG. 1, the concentrate can be supplied directly from flocculation container 4 and whilst obviating the sedimentation container 5 and intermediate container 6, to the membrane filter 17. For this purpose, on the suction side of pump 16, a further suction line leads to the flocculation container 4 and a changeover or switchover valve is then inserted in the two suction lines of pump 16.

The permeate is supplied to tank 7 via a feed line 20 and from the tank it is passed via a third pump 21 and a rinsing line 12 to the working container 2.

As seen in FIG. 1, the concentrate is removed by means of the second pump 16 from intermediate container 6 and is supplied to the membrane filter 17 and then to the circuit again via return flow line 18. The permeate is removed from the membrane filter 17 via feed line 20 and is supplied to tank 7.

Figure 2:
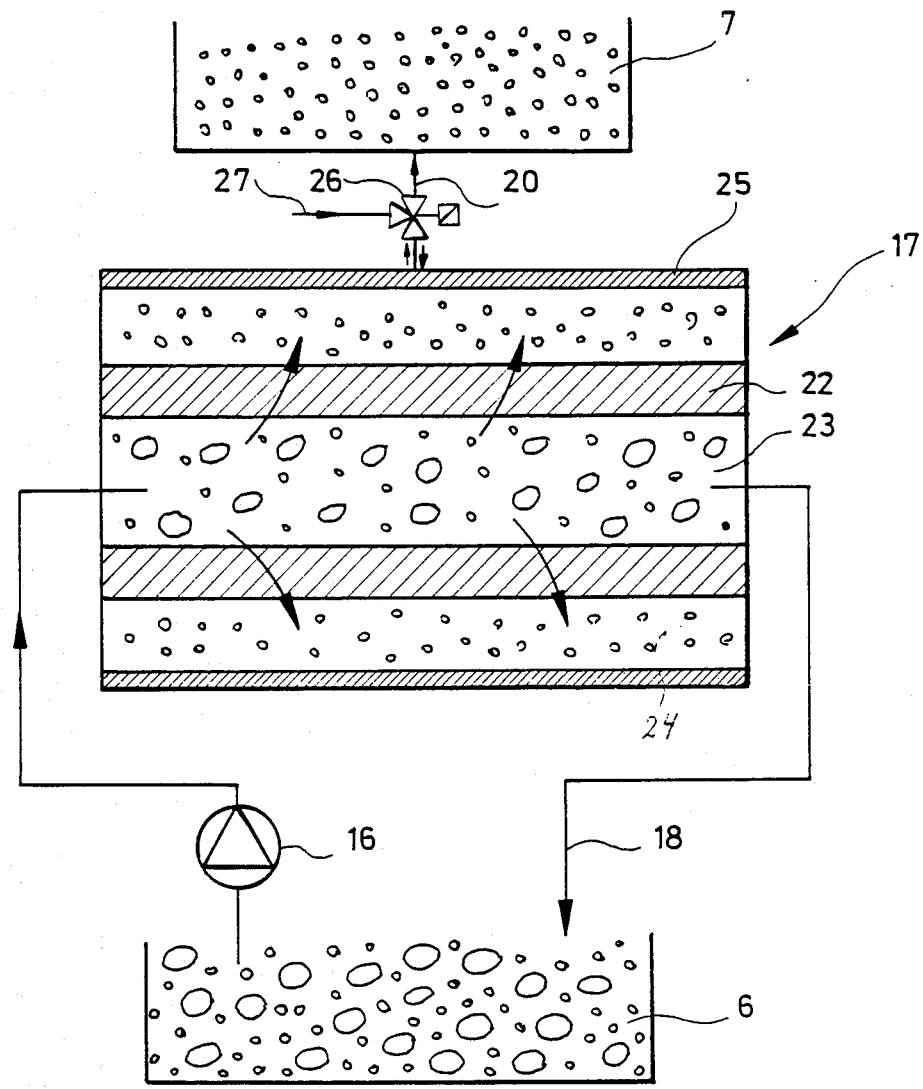
FIG. 2 is a schematic view of a filter of the apparatus according to FIG. 1.

Reference will now be made to FIG. 2, which shows details of the membrane filter 17 shown in FIG. 1 and the associated liquid circuit.

As can be seen in FIG. 2, in a preferred embodiment, the membrane filter 17 has a tubular membrane 22, which separates a concentrate area 23 from a permeate area 24. The filter is enclosed in a cylindrical wall 25.

The drawing shows a single membrane filter element 17. In a practically realized, preferred embodiment a plurality of identical filter elements is provided in flow parallel connection. The flow rate of the concentrate is dependent on the dimensions of the filter and the requirements of the permeate cleanness. In principle, by setting different parameters, every effort will be made to bring the ratio between the permeate quantity and the concentrate quantity as close as possible to 1. However, at present, a ratio of 0.5 is considered to be good.

A pressure of e.g. 2 to 3 bar is applied on the concentrate side to a membrane filter element.

Preference is given to a filter, whose membrane wall is made from hollow fires constituted by polypropylene. The hollow fibres have a diameter of approximately 1.5 mm and a pore size of 0.2 $\mu$m.

Between tank 7 and membrane filter 17 is located an electrically operable valve 27 with which the membrane filter 17 can be shut off for a return rinsing from tank 7 and can be connected to a feed line 27 for an air-water mixture.

At given intervals the membrane filter 17 is cleaned by rinsing in a reverse direction. It is theoretically possible for this purpose to carry out a rinsing back at fixed, predetermined time intervals. However, it is more advantageous to carry out said rinsing in a pressure or flow-dependent manner. As soon as the pressure on the concentrate side exceeds a given value, this constitutes a measure for a given clogging of the filter an this can be detected by a pressure sensor. So-called back-rinsing or rinsing in the direction counter to the filtering direction could also be initiated after a predetermined permeate quantity is reached, which quantity can be detected by means of a flow meter. For back-rinsing purposes valve 26 is switched over and then the membrane filter 17 is subjected to the action of an air-water mixture, to which can optionally be added cleaning chemicals. During a back-rinsing cycle, which can e.g. last 2 minutes, valve 26 is preferably stochastically operated and the individual operating phases can be very short (up to a few seconds). As a result of this irregular, pulse-like back-rinsing, an optimum cleaning effect is obtained. Naturally the second pump 16 is disconnected during the back-rinsing operation.

There has been disclosed heretofore the best embodiment of the invention presently contemplated. However, it is to be understood that various changes and modifications may be made thereto without departing from the spirit of the invention.

What is claimed is:

1. Apparatus comprising: means for filtering a machining liquid or an electroerosion machine, including a pump, a filter connected to said pump and having a membrane, said pump supplying a concentrate to said filter, and means to remove a permeate from said filter, said pump being sized and said filter including means for minimizing clodding constructed in such a way that the concentrate passes substantially tangentially to a wall of said membrane in a circuit and so that a quantity of the concentrate per time unit carried in said circuit is greater than a quantity of the permeate removed per time unit from the filter.

2. Apparatus according to claim 1, wherein the filter is constructed as a tubular filter.

3. Apparatus according to claim 2, wherein the filter has several filter elements arranged in flow parallel connection with one another.

4. Apparatus according to claim 3, wherein the concentrate quantity supplied to each filter element per time unit is between 25 and 50 liters per minute and the permeate quantity drained off from each filter element per time unit is 2.5 to 25 liters per minute.

5. Apparatus according to claim 2, wherein said wall of said membrane has a pore size of 0.02 to 2 $\mu$m.

6. Apparatus according to claim 5, wherein said pore size is 0.2 $\mu$m.

7. Apparatus according to claim 2, and further comprising a collecting container into which can be emptied a dirty working liquid of a working container of the electroerosion machine, a flocculation container, a sedimentation container, to which can be supplied a content of said collecting container, and an intermediate container to which can be supplied a content of said sedimentation container following a sedimentation of said content, wherein the concentrate can be removed from the intermediate container by said pump, passed through the filter and returned in said circuit to the intermediate container, and wherein a tank is provided, to which the permeate is supplied by the filter and the working container of the 8. Apparatus according to claim 7, wherein the flocculation container is arranged between the collecting container and the sedimentation container and a flocculant can be added to the concentrate in said sedimentation container.

9. Apparatus according to claim 8, wherein said wall of said membrane comprises polypropylene hollow fibres having a diameter of approximately 1 to 2 mm and a pore side of 0.2 $\mu$m. electroerosion machine is supplied with permeate by said tank.

10. Apparatus according to claim 1, wherein the concentrate quantity per time unit carried in the circuit is approximately 1.5 times to 10 times greater than the permeate quantity per time unit drained off by the filter.

11. Apparatus according to claim 10, wherein the concentrate quantity per time unit carried in the circuit is 500 to 100 liters per minute and the permeate quantity per time unit drained off from the filter is 20 to 60 liters per minute.

12. Apparatus according to claim 1, wherein said circuit includes an intermediate container supplied with the concentrate, said pump, said filter and a return line connecting said filter to said intermediate container.

13. Apparatus according to claim 12, further including means to periodically rinse said filter in pressure or flow-dependent manner and wherein the filter during each rinsing phase is stochastically subjected to an action of an air-water mixture at irregular time intervals.

14. Apparatus according to claim 13, wherein additional chemicals are mixed with the air-water mixture for rinsing in a direction counter to a filtering direction.

15. Apparatus according to claim 13, wherein said means is operative to rinse the filter in a direction counter to a filtering direction.

16. Apparatus according to claim 12, wherein the intermediate container can be periodically emptied into a settler, which can be discharged.

* * * * *